(12) United States Patent
Cheng

(10) Patent No.: US 11,565,419 B2
(45) Date of Patent: Jan. 31, 2023

(54) METHOD AND DEVICE FOR CONTROLLING A ROBOT, AND ROBOT

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Hui Cheng, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 160 days.

(21) Appl. No.: 16/637,995

(22) PCT Filed: Aug. 15, 2018

(86) PCT No.: PCT/CN2018/100702
§ 371 (c)(1),
(2) Date: Feb. 10, 2020

(87) PCT Pub. No.: WO2019/037641
PCT Pub. Date: Feb. 28, 2019

(65) Prior Publication Data
US 2020/0171663 A1   Jun. 4, 2020

(30) Foreign Application Priority Data
Aug. 22, 2017  (CN) .......................... 201710722341.3

(51) Int. Cl.
*B25J 9/16*   (2006.01)

(52) U.S. Cl.
CPC ............. *B25J 9/1679* (2013.01); *B25J 9/162* (2013.01); *B25J 9/1635* (2013.01); *B25J 9/1664* (2013.01)

(58) Field of Classification Search
CPC ........ B25J 9/1679; B25J 9/162; B25J 9/1635; B25J 9/1664
See application file for complete search history.

(56) References Cited

U.S. PATENT DOCUMENTS

| 7,050,938 B1 * | 5/2006 | Prater .................. G06Q 10/087 |
| | | 702/182 |
| 9,424,470 B1 * | 8/2016 | Hinterstoisser ...... G06V 10/462 |

(Continued)

FOREIGN PATENT DOCUMENTS

| CN | 102289556 A | 12/2011 |
| CN | 103240738 A | 8/2013 |

(Continued)

OTHER PUBLICATIONS

International Search Report dated Sep. 29, 2018 in PCT/CN2018/100702 (with English translation), 13 pages.

(Continued)

*Primary Examiner* — Khoi H Tran
*Assistant Examiner* — Aaron G Cain
(74) *Attorney, Agent, or Firm* — Oblon, McClelland, Maier & Neustadt, L.L.P.

(57) ABSTRACT

A method and device for controlling a robot, and a robot. The device detects whether there is an article being put into or taken out from a storage container of a robot, and if it is detected that an article is put into or taken out from the storage container, an information list is updated according to the article being put into or taken out, the information list recording relevant information about articles in the storage container.

20 Claims, 4 Drawing Sheets

---

It is detected whether there is an article being put into or taken out from a storage container of a robot — 101

If it is detected that an article is put into or taken out from the storage container, an information list is updated according to the article being put into or taken out from the storage container, wherein the information list records relevant information about articles in the storage container — 102

(56) References Cited

U.S. PATENT DOCUMENTS

| | | | | |
|---|---|---|---|---|
| 2007/0016494 | A1* | 1/2007 | Brown | G06Q 10/087 |
| | | | | 705/28 |
| 2008/0147261 | A1* | 6/2008 | Ichinose | G01C 22/006 |
| | | | | 901/1 |
| 2013/0018741 | A1* | 1/2013 | Ostrowski | G07G 1/0036 |
| | | | | 705/23 |
| 2016/0364785 | A1* | 12/2016 | Wankhede | G06Q 30/0639 |
| 2017/0166399 | A1* | 6/2017 | Stubbs | B65G 1/1375 |

FOREIGN PATENT DOCUMENTS

| | | |
|---|---|---|
| CN | 203805951 U | 9/2014 |
| CN | 205862547 U | 1/2017 |
| CN | 206075426 U | 4/2017 |
| CN | 206394676 U | 8/2017 |
| CN | 107283428 A | 10/2017 |
| KR | 10-1497096 B1 | 3/2015 |

OTHER PUBLICATIONS

Combined Chinese Office Action and Search Report dated May 14, 2019 in Chinese Patent Application No. 201710722341.3 (with English translation), 19 pages.

Chinese Office Action dated Dec. 26, 2019 in Chinese Patent Application No. 201710722341.3 (with English translation), 16 pages.

* cited by examiner

METHOD AND DEVICE FOR CONTROLLING A ROBOT, AND ROBOT

CROSS-REFERENCE TO RELATED APPLICATIONS

The present disclosure is based on and claims priority of Chinese patent application NO.201710722341.3, filed on Aug. 22, 2017, the disclosure of which is hereby incorporated into this disclosure by reference in its entirety.

TECHNICAL FIELD

The present disclosure relates to the field of automatic control, and in particular, to a method for controlling a robot and device, and robot.

BACKGROUND

At present, Most shopping carts in the supermarkets are used to store products that users want to purchase. At the end of shopping, users need to push shopping carts to a checkout and take the products out from the carts to the cashier for scanning, in order to collect information about the products purchased by the users for payment.

SUMMARY

According to one aspect of the present disclosure, a method for controlling a robot is provided, comprising: detecting whether there is an article being put into or taken out from a storage container of the robot; updating an information list according to the article being put into or taken out from the storage container if it is detected that an article is put into or taken out from the storage container, wherein the information list records relevant information about articles in the storage container.

In some embodiments, updating an information list according to the article being put into or taken out from the storage container comprises: extracting relevant information about the article being put into the storage container if it is detected that an article is put into the storage container; and recording the relevant information about the article being put into the storage container in the information list.

In some embodiments, updating an information list according to the article being put into or taken out from the storage container comprises: extracting relevant information about the article being taken out from the storage container if it is detected that an article is taken out from the storage container; and deleting the relevant information about the article being taken out from the storage container from the information list.

In some embodiments, the method further comprises: sending the information list to a charging platform after a shopping end instruction is received.

In some embodiments, the method further comprises: determining a path for the robot to move from a current position of the robot to a predetermined parking place after receiving the shopping end instruction; and driving the robot to move along the determined path so as to lead a user to the predetermined parking place.

In some embodiments, the method further comprises: controlling a robotic arm to take articles out from the storage container after the robot reaches the predetermined parking place.

In some embodiments, the method further comprises: detecting whether there is still any article in the storage container after the robot reaches the predetermined parking place and after articles are taken out from the storage container by the user; and sending a notification message if there is still any article in the storage container.

In some embodiments, detecting whether there is still any article in the storage container comprises: detecting a current space size of the storage container; and comparing the current space size with a predetermined space size to determine whether there is still any article in the storage container.

In some embodiments, detecting whether there is still any article in the storage container comprises: detecting a current weight of the storage container; and comparing the current weight with a predetermined weight to determine whether there is still any article in the storage container.

In some embodiments, the method further comprises: determining a storage place of a specified article according to the shopping instruction after receiving a shopping instruction; determining a path for the robot to move from the current position to the storage place; driving the robot to move along the determined path so as to lead a user to the storage place.

In some embodiments, the method further comprises: controlling a robotic arm to grab the specified article to put it into the storage container after the robot reaches the predetermined parking place.

According to another aspect of the present disclosure, a device for controlling a robot is provided, comprising: a memory for storing computer instructions; a processor coupled to the memory, the processor configured to implement the method for controlling a robot according to any one of the above embodiments.

According to another aspect of the present disclosure, a computer-readable storage medium storing computer instructions is provided, the computer instructions implementing the method for controlling a robot according to any one of the above embodiments when executed by a processor.

According to another aspect of the present disclosure, a robot is provided, comprising: a put-into and take-out sensor configured to detect whether there is an article being put into or taken out from a storage container; an electronic tag identifier configured to extract relevant information about an article being put into or taken out from the storage container; a device for controlling a robot configured to determine whether there is an article being put into or taken out from the storage container of a robot according to a detection result of the put-into and take-out sensor, update an information list according to relevant information about the article being put into or taken out from the storage container that is extracted by the electronic tag identifier if there is an article being put into or taken out from the storage container, wherein the information list records relevant information about articles in the storage container.

In some embodiments, the robot further comprises: an image collector configured to collect a current environment image of the robot; a moving mechanism configured to drive the robot to move; wherein the device for controlling a robot is further configured to determine a current position of the robot according to the image collected by the image collector, determine a path for the robot to move from the current position to a target place, and drive the moving mechanism to move along the determined path to lead a user to the target place.

In some embodiments, the robot further comprises: a robotic arm configured to put an article into the storage container or take an article out from the storage container based on the control of the device for controlling a robot.

In some embodiments, the robot further comprises: a space sensor configured to measure a current space size of the storage container; or a weight sensor configured to measure a current weight of the storage container; wherein the device for controlling a robot is further configured to determine whether there is still any article in the storage container according to a measurement result of the space sensor or the weight sensor, so as to send a notification message.

In some embodiments, the robot further comprises: a user interface configured to receive instructions input by a user; the device for controlling a robot is further configured to send the information list to a charging platform after a shopping end instruction is received by the user interface.

Other features and advantages of the present disclosure will become apparent from the following detailed description of exemplary embodiments of the present disclosure with reference to the accompanying drawings.

BRIEF DESCRIPTION OF THE DRAWINGS

In order to more clearly explain the embodiments of the present disclosure or the technical solutions in the prior art, a brief introduction will be given below for the drawings required to be used in the description of the embodiments or the prior art. It is obvious that, the drawings illustrated as follows are merely some of the embodiments of the present disclosure. For a skilled person in the art, he or she may also acquire other drawings according to such drawings on the premise that no inventive effort is involved.

DETAILED DESCRIPTION

Figure 1:
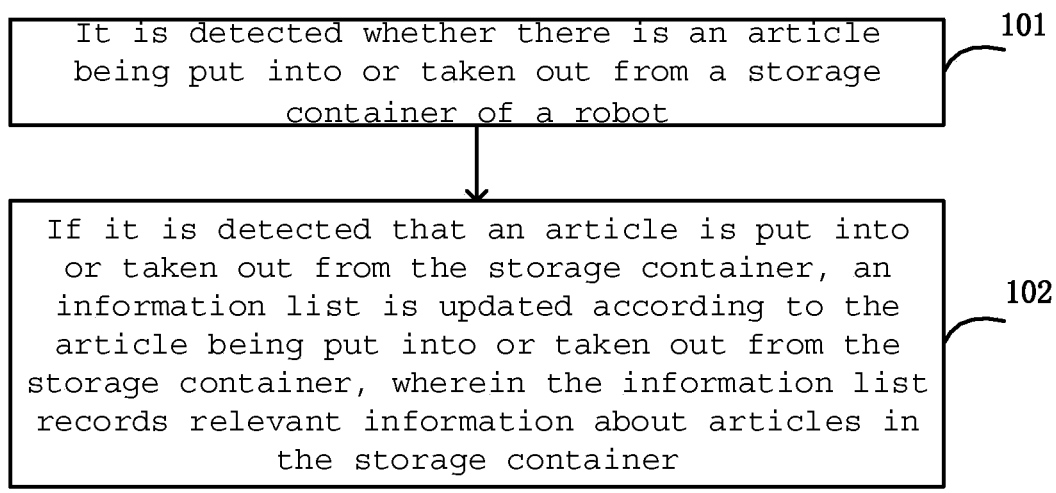
FIG. 1 is a schematic diagram of a method for controlling a robot according to some embodiments of the present disclosure.

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by persons of ordinary skill in the art based on the embodiments of the present disclosure without creative efforts shall fall within the protection scope of the present disclosure.

Unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an article is defined in a drawing, there is no need for further discussion in the accompanying drawings.

The inventor has found that the related technology needs to occupy a user's hands when collecting relevant information about the products purchased by the user, which is very inconvenient for customers who are carrying babies, having mobility problems, or young and old customers, and would affect users shopping experience and efficiency.

Therefore, how to conveniently and quickly collect relevant information about products purchased by users is an urgent problem.

Embodiments of the present disclosure provide a method and device for controlling a robot, and a robot. By collecting and recording relevant information about an article being put into a storage container in time, the information of articles purchased by a user can be counted without the need of scanning the purchased articles one by one at a checkout for the user, thereby freeing the user's hands and significantly improving the user experience.

FIG. 1 is a schematic diagram of a method for controlling a robot according to some embodiments of the present disclosure. In some embodiments, the method may be performed by a device for controlling a robot.

In step 101: it is detected whether there is an article being put into or taken out from a storage container of a robot.

For example, a light detector, a weight detector, a video detector, an electromagnetic wave detector, etc. can be disposed on the robot, for detecting an article put into or taken out from the storage container.

In step 102: if it is detected that an article is put into or taken out from the storage container, an information list is updated according to the article being put into or taken out from the storage container, wherein the information list records relevant information about articles in the storage container.

In some embodiments, if it is detected that an article is put into the storage container, relevant information about the article being put into the storage container is extracted, and then the relevant information about the article being put into the storage container is recorded in the information list.

For example, an electronic tag identifier such as an RFID (Radio Frequency Identification) identifier can be disposed on the robot, and when an article is put into the storage container, relevant information about the article is read out.

In some embodiments, if it is detected that an article is taken out from the storage container, the electronic tag identifier also extracts relevant information about the article, and then the relevant information about the article being taken out from the storage container is deleted from the information list to ensure that the recorded information corresponds to the articles in the storage container.

Based on the method for controlling a robot provided in the above embodiments, through collecting and recording relevant information about an article being put into the storage container in time, information of articles purchased by a user can be counted without the need of scanning the purchased articles one by one at a checkout for the user, thereby freeing the user's hands and significantly improving the user experience.

In some embodiments, a user may send a shopping instruction to a robot to indicate an article to be purchased. After receiving the shopping instruction, the robot determines a storage place of the specified article according to the shopping instruction, determines a path for the robot to move from a current position to the storage place, and then the robot is driven to move along the determined path in order to lead the user to the storage place.

In addition, the robot may further drive a robotic arm mounted on the robot to grab the specified article to put it into the storage container after the robot reaches the storage place.

For example, the user sends an instruction to the robot to purchase a certain seafood product through a touch screen provided on the robot. The robot can determine a position of seafood products through identification, and then plan a path and drive the robot to move accordingly, so as to lead the user to the seafood area for purchase. In addition, the robot can collect images by using a camera to determine a specific position of the specified seafood product on a shelf, and use the robotic arm to grab the specified seafood product to put it into the storage container, thereby improving the user's shopping experience.

Figure 2:
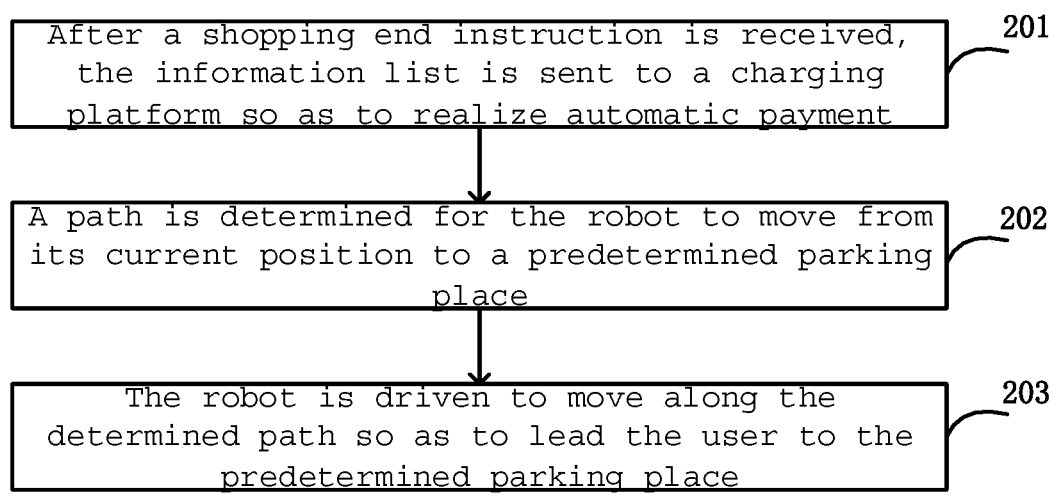
FIG. 2 is a schematic diagram of the method for controlling a robot according to other embodiments of the present disclosure.

FIG. 2 is a schematic diagram of the method for controlling a robot according to other embodiments of the present disclosure. In some embodiments, the method may be performed by a device for controlling a robot.

In step 201: after a shopping end instruction is received, the information list is sent to a charging platform so as to realize automatic payment.

After the user sends a shopping end instruction through the touch screen, the robot can directly send the recorded information list to the charging platform, so that the charging platform can count up the articles purchased by the user according to the information reported by the robot for automatic payment.

Since the present disclosure changes the traditional payment method, it effectively improves the user experience.

In step 202: a path is determined for the robot to move from its current position to a predetermined parking place.

The robot can acquire images of the surrounding environment through a camera and/or lidar to determine the current position.

In step 203: the robot is driven to move along the determined path so as to lead the user to the predetermined parking place.

For example, the predetermined parking place may be a supermarket exit, so that the user can directly pick up the purchased products. For another example, the predetermined parking place may be a user's parking place or a user's home, so that the products purchased by the user can be directly sent home, thereby improving the user's shopping experience.

In some embodiments, after the robot reaches the predetermined parking place, the robot can further control a robotic arm to take out the articles from the storage container, so that the products purchased by the user can be directly delivered to the user, thereby effectively improving the user experience.

In some embodiments, after the robot reaches the predetermined parking place, it can also detect whether there is still any article in the storage container after the articles in the storage container have been taken out from the storage container by the user, and if there is still any article in the storage container, a notification message can be sent. This effectively prevents the user from leaving the purchased products in the storage container.

For example, a space detector may be disposed on the robot to detect a current space size of the storage container. The current space size can be compared with a predetermined space size to determine whether there is still any article in the storage container. For example, the space detector may be a depth detector, a volume detector, a capacity detector, or the like.

For example, if there is an article in the storage container, the depth value of the storage container will become smaller. Therefore, by detecting the depth of the storage container, it can be determined whether the user has missed an article.

As another example, a weight sensor can be disposed on the robot to detect a weight change of the storage container. Through comparing a current weight of the storage container with a predetermined weight, it is determined whether there is still any article in the storage container.

For example, after an elapse of a period of time after the robot reaches the predetermined parking place, if the weight of the storage container is greater than the weight of the storage container when it is empty, it indicates that the user has left at least one purchased product in the storage container.

Figure 3:
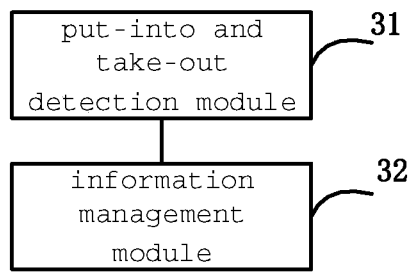
FIG. 3 is a schematic diagram of a device for controlling a robot according to some embodiments of the present disclosure.

FIG. 3 is a schematic diagram of a device for controlling a robot according to some embodiments of the present disclosure. As shown in FIG. 3, the device for controlling a robot may include a put-into and take-out detection module 31 and an information management module 32.

The put-into and take-out detection module 31 is configured to determine whether there is an article being put into or taken out from a storage container of a robot according to a detection result of a put-into and take-out sensor.

For example, the put-into and take-out sensor may be a light detector, a weight detector, a video detector, an electromagnetic wave detector, etc. for detecting an article being put into or taken out from the storage container.

The information management module 32 is configured to update an information list according to the article being put into or taken out from the storage container if there is an article being put into or taken out from the storage container, wherein the information list records relevant information about articles in the storage container.

In some embodiments, the put-into and take-out detection module 31 is further configured to trigger an electronic tag identifier to extract relevant information about the article if there is an article being put into the storage container. In some embodiments, the electronic tag identifier can directly extract relevant information about an article being put into or taken out from the storage container passing through the electronic tag identifier without being triggered by the put-into and take-out detection module 31.

The information management module 32 is configured to record the relevant information about the article being put into the storage container that is extracted by an electronic tag identifier in the information list if there is an article being put into the storage container.

In addition, the put-into and take-out detection module 31 is further configured to trigger an electronic tag identifier to extract relevant information about the article if there is an article being taken out from the storage container.

The information management module 32 is configured to delete the relevant information about the article being taken out from the storage container that is extracted by an electronic tag identifier from the information list if there is an article being taken out from the storage container.

This ensures that the recorded information corresponds to the articles in the storage container.

Based on the device for controlling a robot provided in the above embodiments, through collecting and recording relevant information of an article being placed in the storage container in time, information of articles purchased by a user can be counted without the need of scanning the purchased articles one by one at a checkout for the user, thereby freeing the user's hands and significantly improving the user experience.

In some embodiments, the information management module 32 is further configured to send the information list to a charging platform after a shopping end instruction is received by a user interface, so as to realize automatic payment and improve the user experience.

Figure 4:
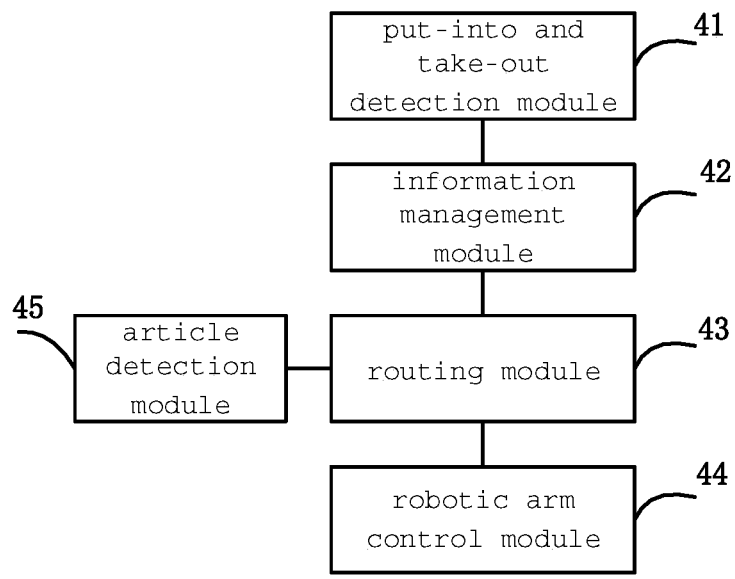
FIG. 4 is a schematic diagram of the device for controlling a robot according to other embodiments of the present disclosure.

FIG. 4 is a schematic diagram of the device for controlling a robot according to other embodiments of the present disclosure. Compared with the embodiments shown in FIG. 3, in the embodiments shown in FIG. 4, the device for controlling a robot comprises a routing module 43 in addition to the put-into and take-out detection module 41 and the information management module 42.

the routing module 43 is configured to determine a current position of the robot according to an image collected by an image collector, determine a path for the robot to move from the current position to a target place, and drive a moving mechanism to move along the determined path to lead a user to the target place.

In some embodiments, the routing module 43 is configured to determine a current position of the robot according to an image collected by an image collector after receiving a shopping end instruction by a user interface, determine a path for the robot to move from the current position to a predetermined parking place, and drive a moving mechanism to move along the determined path to lead a user to the predetermined parking place.

For example, after the user finishes shopping, the articles purchased by the user are sent to an exit of the supermarket, directly to the user's car, or delivered to the user' home with a truck to improve the user experience.

In addition, the routing module 43 is further configured to determine a storage place of a specified article according to a shopping instruction received by a user interface, determine a path for the robot to move from a current position to the storage place, and drive a moving mechanism to move along the determined path in order to lead a user to the storage place. This allows users to be automatically guided to find what they need.

In some embodiments, in the embodiments shown in FIG. 4, the device for controlling a robot further comprises a robotic arm control module 44 for controlling a robotic arm to take articles out from the storage container after the robot reaches the predetermined parking place, so that the purchased articles can be directly delivered to the user, thereby improving the user experience.

In some embodiments, when a user is shopping, the robotic arm control module 44 is further configured to control the robotic arm to grab a specified article to put it into the storage container after the robot reaches the storage place, thereby facilitating the shopping of the user.

In some embodiments, in the embodiments shown in FIG. 4, the device for controlling a robot further comprises an article detection module 45, which is configured to detect whether there is still any article in the storage container after the robot reaches the predetermined parking place and after the articles in the storage container have been taken out from the storage container by the user, and send a notification message if there is still any article in the storage container.

For example, the article detection module 45 determines a current space size of the storage container according to a measurement result of a space sensor, and compares the current space size with a predetermined space size to determine whether there is still any article in the storage container.

In some embodiments, the space detector may be a depth detector, a volume detector, a capacity detector, or the like.

For example, if there is an article in the storage container, the depth of the storage container will become smaller. Therefore, by detecting the depth of the storage container, it can be determined whether the user has missed an article.

As another example, the article detection module 45 determines a current weight of the storage container according to a measurement result of a weighting sensor, and compare the current weight with a predetermined weight to determine whether there is still any article in the storage container.

Through the above processing, it is possible to effectively prevent the user from leaving a purchased article in the storage container.

Figure 5:
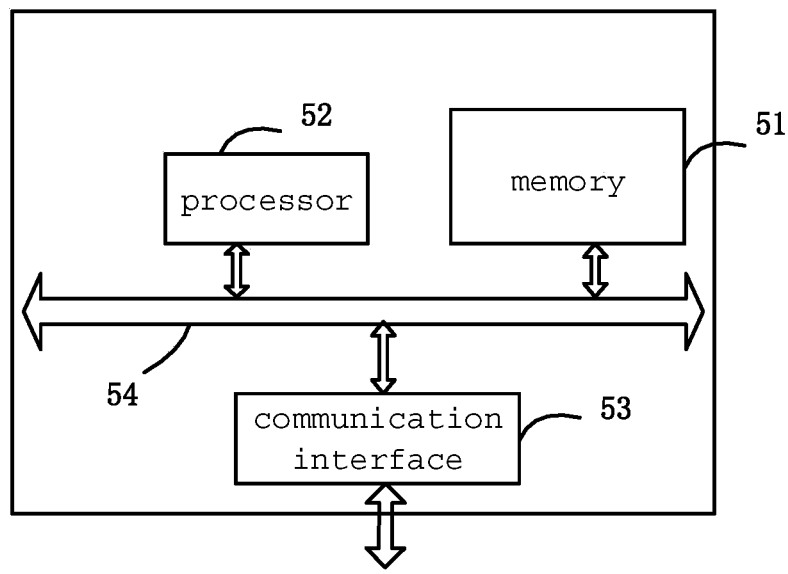
FIG. 5 is a schematic diagram of the device for controlling a robot according to still other embodiments of the present disclosure.

FIG. 5 is a schematic diagram of the device for controlling a robot according to still other embodiments of the present disclosure. As shown in FIG. 5, the device for controlling a robot comprises a memory 51 and a processor 52.

The memory 51 is used to store instructions. The processor 53 is coupled to the memory 51, and is configured to, based on instructions stored in the memory, implement the method for controlling a robot of any one of the embodiments in FIGS. 1 to 2.

As shown in FIG. 5, the device for controlling a robot further comprises a communication interface 53 for performing information interaction with other devices. In addition, the device further comprises a bus 54. The processor 52, the communication interface 53, and the memory 51 perform communication with each other through the bus 54.

The memory 51 may include a high speed RAM memory, and may also include a non-volatile memory such as at least one disk storage device. The memory 51 can also be a memory array. The memory 51 may also be partitioned into blocks, which may be combined into virtual volumes according to a certain rule.

The processor 52 may be a central processing unit (CPU), or may be an Application Specific Integrated Circuit (ASIC) or one or more integrated circuits configured to implement the embodiments of the present disclosure.

The present disclosure further discloses a computer-readable storage medium storing computer instructions, which implement the method according to any one of the above embodiments in FIGS. 1 and 2 when executed by a processor.

Figure 6:
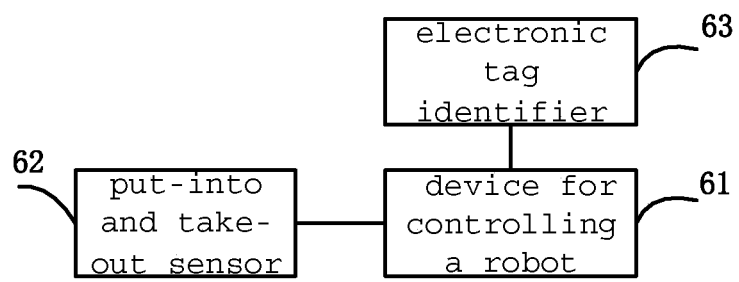
FIG. 6 is a schematic diagram of a robot according to some embodiments of the present disclosure.

FIG. 6 is a schematic diagram of a robot according to some embodiments of the present disclosure. As shown in FIG. 6, the robot may comprise a device 61 for controlling a robot, a put-into and take-out sensor 62, and an electronic tag identifier 63. The device 61 for controlling a robot may be a device for controlling a robot according to any one of the embodiments in FIGS. 3 to 5. The device 61 for controlling a robot is configured to determine whether there is an article being put into or taken out from a storage container of a robot according to a detection result of the put-into and take-out sensor; if there is an article being put into or taken out from the storage container, update an information list according to relevant information about the article being put into or taken out from the storage container extracted by the electronic tag identifier. The put-into and take-out sensor 62 is configured to detect whether there is an article being put into or taken out from the storage container, and send a detection result to the device 61 for controlling a robot. The electronic tag identifier 63 is configured to extract relevant information about an article being put into or taken out from the storage container, and send the extracted information to the device for controlling a robot. In this way, the device 61 for controlling a robot updates the information list according to the article being put into or taken out from the storage container.

For example, the put-into and take-out sensor may be a light detector, a weight detector, a video detector, an electromagnetic wave detector, etc. for detecting an article being put into or taken out from the storage container.

Figure 7:
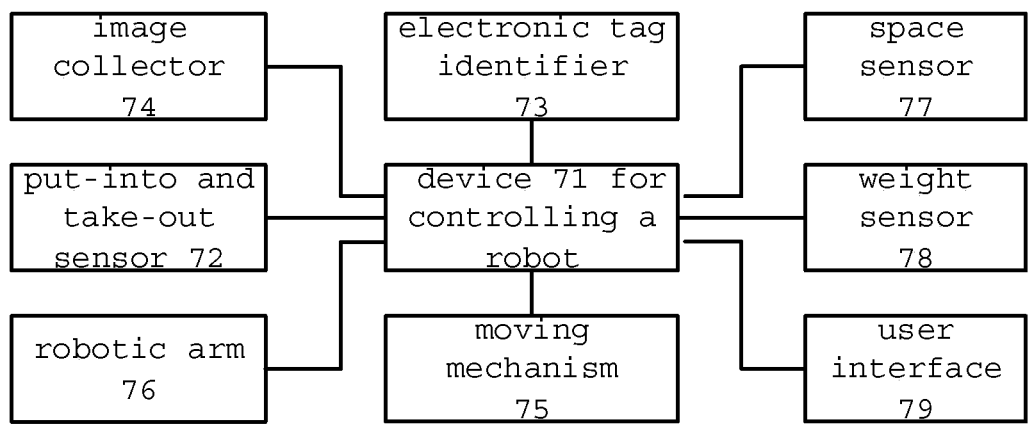
FIG. 7 is a schematic diagram of the robot according to other embodiments of the present disclosure.

FIG. 7 is a schematic diagram of the robot according to other embodiments of the present disclosure. Compared with the embodiments shown in FIG. 6, in the embodiments shown in FIG. 7, in addition to the device 71 for controlling a robot, the put-into and take-out sensor 72, and the electronic tag identifier 73, it further comprises an image collector 74 to collect a current environment image of a robot, and send the collected image information to the device 71 for controlling a robot, so that the robot can identify a corresponding article, determine a current position of the robot, and so on.

In addition, the robot further comprises a moving mechanism 75 configured to drive the robot to move.

The device 71 for controlling a robot is further configured to determine a current position of the robot according to an image collected by the image collector 74, determine a path for the robot to move from the current position to a target place, and drive a moving mechanism 75 to move along the determined path to lead a user to the target place.

In some embodiments, as shown in FIG. 7, the robot further comprises a robotic arm 76 configured to put an article into a storage container or take out an article from the storage container based on the control of the device for controlling a robot.

In some embodiments, as shown in FIG. 7, the robot further comprises a space sensor 77 configured to measure a current space size of the storage container, and send a measurement result to the device 71 for controlling a robot, so that the robot can determine whether there is still any article in the storage container.

In some embodiments, the space detector may be a depth detector, a volume detector, a capacity detector, or the like.

In some embodiments, the robot further comprises a weight sensor 78 configured to measure a current weight of the storage container and send a measurement result to the device 71 for controlling a robot, so that the robot can determine whether there is still any article in the storage container. In addition, the robot can distinguish and identify the weight of an article put into the storage container based on a measurement results of the weight sensor 78.

In addition, the robot is also provided with a user interface 79, such as a touch screen, for receiving instructions input by a user and displaying relevant information in order to interact with the user.

The device 71 for controlling a robot is further configured to send the information list to a charging platform after a shopping end instruction is received by the user interface 79.

Figure 8:
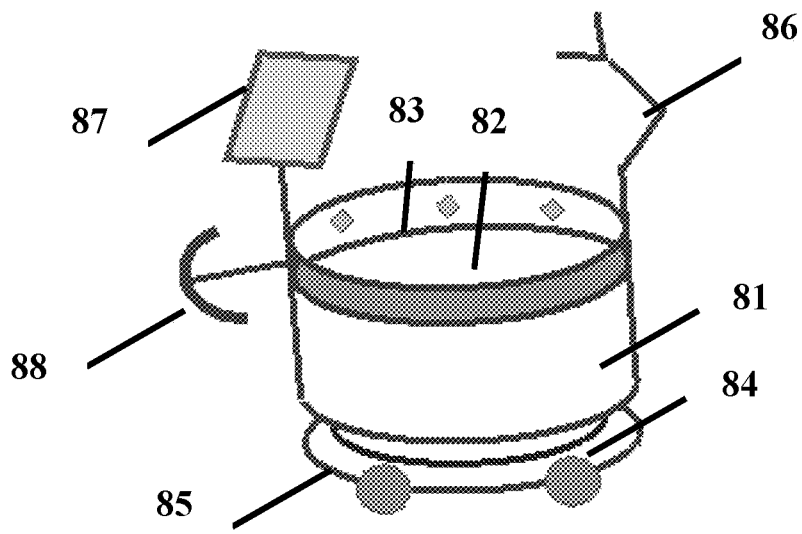
FIG. 8 is a schematic diagram of a shopping robot according to some embodiments of the present disclosure.

FIG. 8 is a specific example of a shopping robot of the present disclosure. The shopping robot can be used as a shopping cart in a supermarket, for example. As shown in FIG. 8, the shopping robot 81 is provided with a storage container 82, and an annular sensor strip 83 is provided at the entrance of the storage container 82. Sensors such as a light sensor and an electronic tag identifier can be provided on the sensor strip 83, and the detection accuracy and sensitivity can be improved by an annular arrangement of the sensors. A weight sensor 84 is provided below the storage container 82 to measure the weight of the storage container 82. A moving mechanism 85 is also provided at the lower portion of the robot 81, so that the robot 81 can move as required.

In addition, the robot 81 is also provided with a robotic arm 86 for putting an article into the storage container 82 or taking out an article from the storage container 82. The robot 81 is also provided with a touch screen 87 for interacting with the user. In addition, a handle 88 is provided on the robot 81 so that the user can push and pull the shopping robot.

By implementing the present disclosure, it is possible to automatically count information of articles that the user puts into the shopping robot in order to realize automatic payment. Moreover, the shopping robot can navigate according to the user's instructions, automatically lead the user to find a required article, deliver the articles to the user using the robotic arm, and can remind the user in time when an article is missing, which can effectively improve the user's shopping experience.

One skilled in the art should understand that, the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above description of this invention is given for illustration and description, but is not exhaustive and is not intended to limit the present invention to the form disclosed herein. Various modifications and variations are apparent for a person of ordinary skill in the art. Embodiments are selected and described for a better illustration of the principle and practical application of this invention, so that those skilled in the art can understand this invention and envisage various embodiments with various modifications suited to specific usages.

What is claimed is:

1. A method for controlling a shopping robot, wherein an annular sensor strip is provided at an entrance of a storage container of the shopping robot, comprising:
   detecting whether there is an article being put into or taken out from the storage container of the shopping robot using a put-into and take-out sensor provided on the annular sensor strip;
   extracting relevant information about the article being put into or taken out from the storage container using an electronic tag identifier provided on the annular sensor strip;
   updating an information list according to the article being put into or taken out from the storage container if it is detected that an article is put into or taken out from the storage container, wherein the information list records relevant information about articles in the storage container, and the information list is used to collect information about the articles purchased by a user; and
   sending the information list to a charging platform for payment after a shopping end instruction is received.

2. The method according to claim 1, wherein
   updating an information list according to the article being put into or taken out from the storage container comprises:
   extracting relevant information about the article being put into the storage container if it is detected that an article is put into the storage container; and
   recording the relevant information about the article being put into the storage container in the information list.

3. The method according to claim 1, wherein
   updating an information list according to the article being put into or taken out from the storage container comprises:
   extracting relevant information about the article being taken out from the storage container if it is detected that an article is taken out from the storage container; and
   deleting the relevant information about the article being taken out from the storage container from the information list.

4. The method according to claim 1, further comprising:
   determining a path for the robot to move from a current position of the robot to a predetermined parking place after receiving the shopping end instruction; and
   driving the robot to move along the determined path so as to lead a user to the predetermined parking place.

5. The method according to claim 4, further comprising:
   controlling a robotic arm to take articles out from the storage container after the robot reaches the predetermined parking place.

6. The method according to claim 1, further comprising:
   determining a storage place of a specified article according to the shopping instruction after receiving a shopping instruction;
   determining a path for the robot to move from the current position to the storage place; and
   driving the robot to move along the determined path so as to lead a user to the storage place.

7. The method according to claim 6, further comprising:
   controlling a robotic arm to grab the specified article to put it into the storage container after the robot reaches a predetermined parking place.

8. A device for controlling a robot, comprising:
   a memory for storing computer instructions; and
   a processor coupled to the memory, the processor configured to implement the method for controlling a robot according to claim based on the computer instructions stored in the memory.

9. A non-volatile computer-readable storage medium storing computer instructions, which when executed by a processor implement the method for controlling a robot according to claim 1.

10. A shopping robot, comprising:
    a storage container, wherein an annular sensor strip is provided at an entrance of the storage container;
    a put-into and take-out sensor provided on the annular sensor strip configured to detect whether there is an article being put into or taken out from a storage container;
    an electronic tag identifier provided on the annular sensor strip configured to extract relevant information about an article being put into or taken out from the storage container;
    a device for controlling a robot configured to:
        determine whether there is an article being put into or taken out from the storage container according to a detection result of the put-into and take-out sensor,
        update an information list according to relevant information about the article being put into or taken out from the storage container that is extracted by the electronic tag identifier if there is an article being put into or taken out from the storage container, wherein the information list records relevant information about articles in the storage container and the information list is used to collect information about the articles purchased by a user, and
        send the information list to a charging platform for payment after a shopping end instruction is received.

11. The shopping robot according to claim 10, further comprising:
    an image collector configured to collect a current environment image of the robot;
    a moving mechanism configured to drive the robot to move;
    the device for controlling a robot is further configured to determine a current position of the robot according to the image collected by the image collector, determine a path for the robot to move from the current position to a target place, and drive the moving mechanism to move along the determined path to lead a user to the target place.

12. The shopping robot according to claim 10, further comprising:
a robotic arm configured to put an article into the storage container or take an article out from the storage container based on the control of the device for controlling a robot.

13. The shopping robot according to claim 10, further comprising:
a weight sensor configured to measure a current weight of the storage container;
wherein the device for controlling a robot is further configured to compare the current weight of the storage container with a weight when the storage container is empty to determine whether there is still any article in the storage container according to a measurement result of the weight sensor, so as to send a notification message.

14. The shopping robot according to claim 10, further comprising:
a user interface configured to receive instructions input by a user.

15. The method according to claim 1, wherein the put-into and take-out sensor is a light detector, a video detector, or an electromagnetic wave detector.

16. The method according to claim 1, further comprising:
detecting whether there is still any article in the storage container after articles are taken out from the storage container by the user; and
sending a notification message if there is still any article in the storage container.

17. The method according to claim 16, wherein detecting whether there is still any article in the storage container comprises:
detecting a current depth value of storage space of the storage container using a depth detector, wherein the current depth value is a distance from the entrance to a bottom of the storage container; and
comparing the current depth value with a depth value when the storage container is empty to determine whether there is still any article in the storage container.

18. The method according to claim 16, wherein detecting whether there is still any article in the storage container comprises:
detecting a current weight of the storage container using a weight sensor; and
comparing the current weight of the storage container with a weight when the storage container is empty to determine whether there is still any article in the storage container.

19. The shopping robot according to claim 10, further comprising:
a depth sensor configured to detect a current depth value of storage space of the storage container, wherein the current depth value is a distance from the entrance to a bottom of the storage container,
wherein the device for controlling a robot is further configured to compare the current depth value with a depth value when the storage container is empty to determine whether there is still any article in the storage container.

20. The shopping robot according to claim 10, wherein the put-into and take-out sensor is a light detector, a video detector, or an electromagnetic wave detector.

* * * * *